Dec. 15, 1953        C. G. SONTHEIMER        2,662,404
SYSTEM RESPONSIVE TO LIQUID LEVELS
Filed May 11, 1946                          2 Sheets-Sheet 1
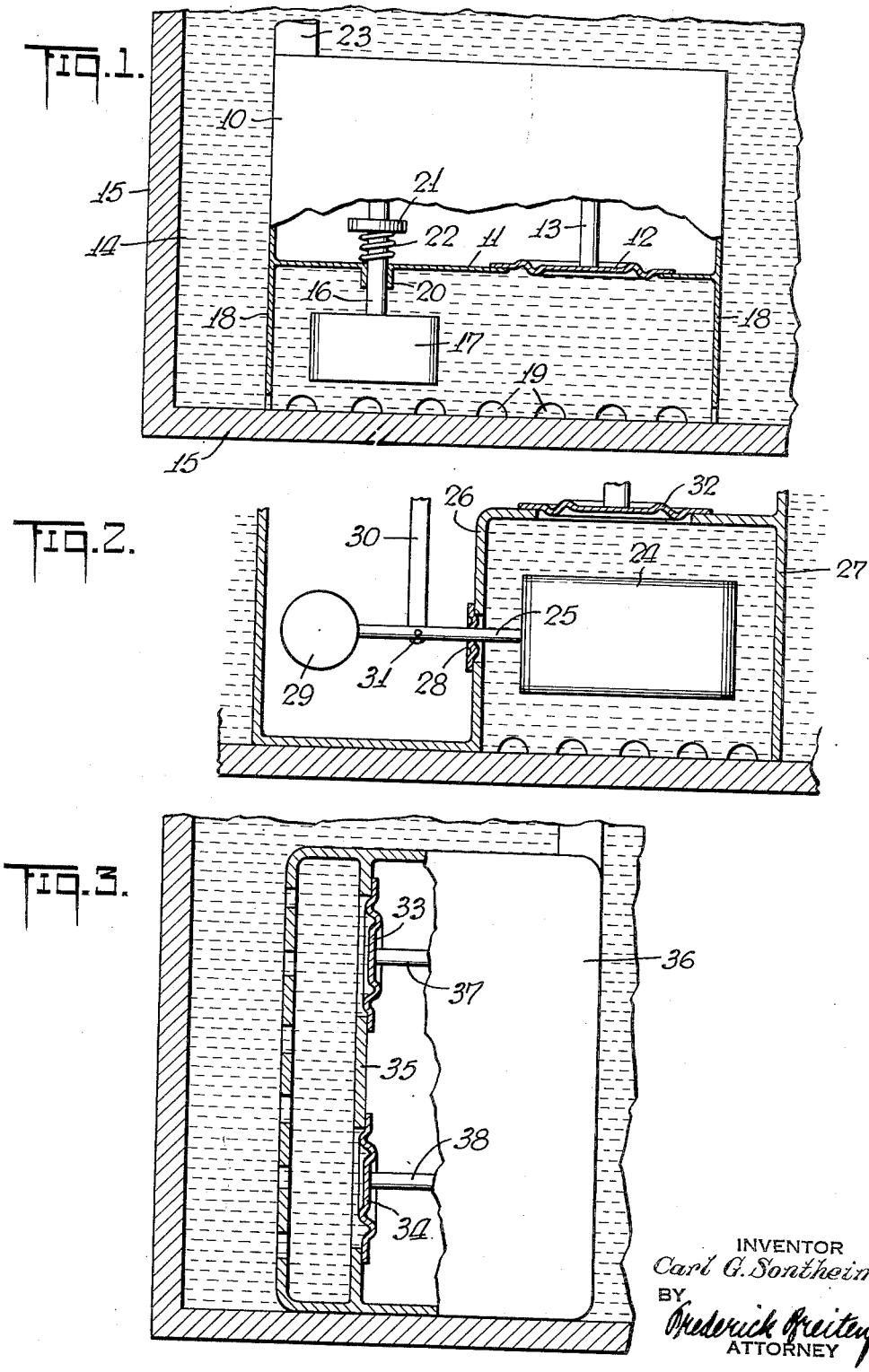

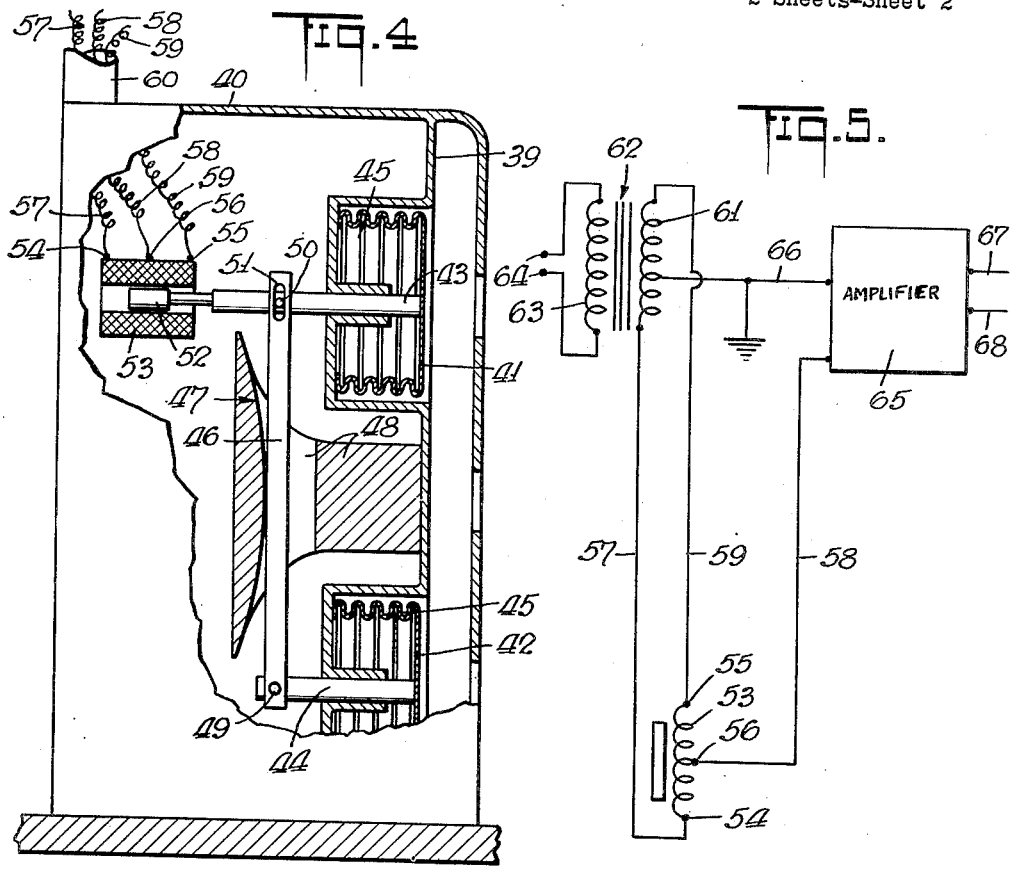

Patented Dec. 15, 1953

2,662,404

UNITED STATES PATENT OFFICE 2,662,404

SYSTEM RESPONSIVE TO LIQUID LEVELS

Carl G. Sontheimer, Riverside, Conn.

Application May 11, 1946, Serial No. 669,088

5 Claims. (Cl. 73—299)

My present invention relates generally to the indication, measurement, or control of liquid levels in industrial and marine installations, and has particular reference to an improved system which is responsive to variations in height of a liquid above a selected base level.

A general object of the invention is to provide a thoroughly practical apparatus for isolating and harnessing to useful purpose a parameter which is a function of or proportional solely to liquid level variations, regardless of the density, viscosity, temperature, dielectric constant, or other characteristics of the liquid.

It is a more particular object of the invention to provide an improved system which may, if desired, be embodied in the form of a relatively compact unit of such character as to permit prefabrication in quantity, and ready installation, at low cost, in any of the large varieties of tanks and similar vessels which are used in the chemical industries and elsewhere for the storage or treatment of liquids and in connection with which it is required or desirable that the liquid level be indicated at a remote point, measured, maintained, or otherwise regulated.

Among the special advantages of the present improved system and installation are a complete absence of any necessity for moving parts or mechanisms (other than minute movements of negligible character), and the capability of embodying the basic concepts in a construction in which such parts as do move are so arranged and function in such a way that elastic strains and the problems of lubrication, of corrosion, and of wear and tear are almost completely, if not entirely, avoided.

Systems heretofore used and suggested in which reliance is placed upon the pressure exerted by the liquid at a selected submerged level are deficient for the basic reason that pressure is a function of the liquid's density; and such a system must therefore be re-set, or its associated mechanism re-calibrated or otherwise re-adjusted, for each liquid with which it is used. Systems employing floats adapted to move upwardly or downwardly as the level of the liquid rises or falls may avoid this difficulty if the float is light enough in weight, but fail prematurely due to the large mechanical movements required. Photoelectric and capacitative methods avoid the float and its mechanical shortcomings, but suffer from other defects such as elaborate and costly installation, and are also subject to re-calibration or re-adjustment for each type of liquid.

However, the pressure of the liquid at a selected base level can be used as a convenient and readily harnessed variable for achieving the desired result, provided that some compensatory means is provided for eliminating the density of the liquid as an influencing factor; and it is a characterising feature of my invention to do this in a unique and practical manner.

Since the pressure at a selected base level is $$p = hd$$

where $h$ is the height of the liquid above the base level, and $d$ is the density of the liquid, the pressure $p$ is a parameter $P_1$ of the product $h$ and $d$; and my invention is predicated upon the realization that the isolation of another parameter $P_2$ which is proportional solely to the density $d$ affords an opportunity to establish a ratio $$\frac{P_1}{P_2}$$

which can be caused to serve admirably as a variable which is directly proportional to height alone.

The successful achievement of this objective has the advantage that the system requires no special or unusually expensive installation dependent upon the particular liquid with which it is to be used; that once installed it needs no re-setting or re-calibration in the event that one liquid is replaced by another; and that the installation functions accurately regardless of density or other changes which the liquid may undergo during its storage, as may occur in many chemical processes and the like.

In essence, my invention resides in providing, in combination, a means for isolating a parameter of the liquid pressure at a selected base level, a means for isolating a parameter of the density of the liquid, and a means which is responsive to the ratio of these parameters. This last-named means may serve various functions, e. g., it may itself be or it may control a liquid-level indicator of some sort, either visual, auditory, or otherwise, it may actuate a recorder or its equivalent, or it may regulate a control mechanism for altering the liquid level in a predetermined fashion. Also, it may assume various forms, either mechanical, electrical, or of any other suitable character.

In the embodiment of the invention herein illustrated by way of example, this ratio-responsive means comprises a mechanical instrumentality by means of which the varying ratio between the two isolated parameters may be conveniently translated, either electrically or otherwise, into such indications, readings, recordings, or regulatory activities, as circumstances may require.

I have chosen to illustrate two practical methods whereby the desired parameters may be isolated and their ratio measured. In one case, the parameter proportional to the liquid pressure is caused to manifest itself in movements of a diaphragm or the like, of predetermined area, positioned at the base level from which the height of the liquid is to be computed; and the parameter proportional to the density is isolated by recourse to the buoyancy force acting upon an immersed body of fixed predetermined dimensions In the other case, I utilize two diaphragms or equivalent elements arranged at a fixed vertical spacing from each other, and measure the ratio of the forces acting upon them.

I may achieve these general objectives and advantages, and such other objects and advantages as may hereinafter appear or be pointed out, in the manner illustratively exemplified in the accompanying drawings, in which:

Figure 1 is an elevational view, partly in section, of an apparatus embodying the features of the invention, the parts shown being explanatory of the basic principles involved;

Figure 2 is a similar explanatory view, illustrating a slight modification of the arrangement of Figure 1;

Figure 3 is a similar explanatory view, illustrating an alternative construction;

Figure 4 is an elevational view, partly in section, of a slightly modified and more completely illustrated version of a construction of the general type shown in Figure 3;

Figure 5 is a wiring diagram of an illustrative electrical method of practical utilization of the effects produced by the construction of Figure 4; and Figure 6 is a wiring diagram of one illustrative way in which the installation of Figures 4 and 5 may be used as a liquid-level control.

The embodiment of the invention indicated in Figure 1 comprises a liquid-tight housing 10. Mounted in the bottom wall 11 is a diaphragm 12 of any suitable character, of fixed known area, and an actuating post 13 is suitably secured to the inner face of the diaphragm, or otherwise associated with it, so that the slight deflections of the diaphragm (under the influence of varying heights of liquid 14 in the tank or reservoir 15) will cause corresponding longitudinal movements of the post 13. Also mounted in the wall 11 is a post 16 which projects through the wall in liquid-tight relation thereto and is secured at its bottom end to a body 17 of fixed known dimensions and volume. The entire structure is so mounted or positioned within the tank 15 that the body 17 will be exposed on all sides to the pressure of the liquid 14 in which it is submerged, and one way of doing this is to provide the housing 10 with a depending skirt portion 18 adapted to rest on the bottom wall of the tank 15, openings 19 of any suitable or desired character serving to establish a communication with the main body of liquid within the tank. Obviously, if desired, the housing 10 could be secured or supported, by suitable brackets or the like, on one of the side walls of the tank 15. The body 17 is constantly subjected to a buoyancy force whose variations are reflected in slight longitudinal movements of the post 16.

Any suitable means may be employed for making the joint between the post 16 and the wall 11 liquid-tight without impairing the freedom of movement of the post. For example, a sleeve of flexible yieldable rubber or the like might be fitted over the bearing 20, the upper end being suitably clamped to this bearing, the lower end being similarly clamped to the post 16 somewhere below the bearing 20.

Within the housing 10, the post 16 is provided with a flange or collar 21, and a spring 22 is operatively interposed between this collar and the wall 11. The spring is so chosen that it accurately balances the weight in air of the body 17, whereby movements of the post 16 are truly responsive only to the force of buoyance acting upon the body 17. This body may be composed of any suitable rigid material, such as wood, metal, or the like, and the body is preferably hollow to simplify manufacture and to reduce its weight.

Within the housing 10 there is a mechanism which responds to and coordinates the movements of the posts 13 and 16 in a predetermined manner, as will be presently described. If this mechanism is intended to actuate an indicator, recorder, or control at some remote point outside of the tank, an electrical transmission or the like may be caused to lie within a suitable conduit 23 extending from the housing 10, as indicated.

The principle of operation is as follows:

The force F acting upon the diaphragm 12 is equal at all times to the product of the area A of the diaphragm, the density $d$ of the liquid, and the height $h$ of the liquid above the base level at which the diaphragm is positioned. That is, $$F = Ahd \qquad (1)$$

The force of buoyancy acting upon the submerged body 17 is the difference between the force $F_B$ acting upwardly upon its bottom surface, and the force $F_T$ acting downwardly upon its top surface; and is also equal to the weight of liquid displaced by the body 17, i. e., the product of the volume V of the body 17 and the density $d$ of the liquid. Thus, $$F_B - F_T = Vd \qquad (2)$$

It follows that the ratio of the force F to the buoyancy force $(F_B - F_T)$ is directly proportional to the height $h$, independent of the density $d$, since $$\frac{F}{F_B - F_T} = \frac{Ahd}{Vd} = \frac{Ah}{V} \qquad (3)$$

and since the diaphragm area A and the volume V of the body 17 are both constants. Obviously, the force F is a parameter proportional to the pressure $(hd)$ at the base level, while the buoyancy force $(Vd)$ is a parameter proportional to the density of the liquid. Any mechanism, therefore, which is capable of responding to the ratio between these parameters will be serving the highly useful and desirable function of isolating a parameter of the height $h$ above the base level.

The only error in these computations is the minor one which arises from the fact that the presence of the post 16 diminishes the force $F_T$ by a minute amount corresponding to the cross-sectional area of the post 16; but this error may be caused to be of negligible magnitude by judicious selection of materials and dimensions whereby the cross-sectional area of the post 16, at its area of contact with the body 17, is caused to be as small as possible relative the top area of the body 17. In any case, this error can be completely avoided by a slight modification of the structure as shown in Figure 2.

In Figure 2, the submerged body 24 is supported along its side wall by a bar 25 which projects through a vertical wall 26 in the housing 27. A liquid-tight flexible joint is established at the region 28, this point serving also as a fulcrum of a lever at one end of which is the body 24 and at the other end of which is a weight 29 which is so chosen that it exactly balances the weight in air of the body 24. That is, the lever arms and the weight 29 are so constructed that the up-and-down movements of the rod 30 (articulated to the bar 25 at 31 and corresponding to the post 16 of Figure 1) are truly responsive to the buoyancy force acting upon the body 24. The diaphragm 32 corresponds to the diaphragm 12 of Figure 1.

The arrangement of parts shown in Figure 2 has the additional advantage that the spring 22 may be dispensed with, thus further simplifying the assembly as a whole.

An alternative embodiment of the invention, operating on the same basic principle, is indicated in Figure 3, in which a pair of diaphragms 33 and 34 are employed. These diaphragms are of known area and are mounted at a known and fixed vertical spacing from each other within the vertical side wall 35 of a housing 36 corresponding to the housing 10 of Figure 1. Posts 37 and 38 are connected or otherwise associated with the diaphragms 33 and 34, respectively, so that longitudinal movements of these posts will correspond to the deflections of the diaphragms under varying pressure of the liquid as its height changes.

The operation of the installation of Figure 3 is as follows:

Assuming for the sake of simplicity that the areas of the diaphragms 33 and 34 are equal, then the force $F_1$ acting upon the upper diaphragm is at all times equal to $$F_1 = Ahd \qquad (4)$$

and the force $F_2$ acting upon the lower diaphragm is at all times $$F_2 = A(h+x)d \qquad (5)$$

where $A$ is the diaphragm area, $h$ is the height of the liquid above the base level defined by the midpoint of the upper diaphragm, $d$ is the density of the liquid, and $x$ is the vertical distance between the midpoints of the two diaphragms.

By subtracting $F_1$ from $F_2$, it appears that $$F_2 - F_1 = A(h+x)d - Ahd$$
$$= Axd \qquad (6)$$

and since $A$ and $x$ are known constants, the difference $(F_2 - F_1)$ is a parameter proportional to the density of the liquid.

From Equation 4 it is apparent that $F_1$ is a parameter proportional to the liquid pressure at the base level, i. e., the level of the midpoint of the upper diaphragm 33.

The ratio of $F_1$ to $(F_2 - F_1)$ yields the information that $$\frac{F_1}{F_2 - F_1} = \frac{Ahd}{Axd} = \frac{h}{x} \qquad (7)$$

indicating that this ratio is a parameter of the liquid height $h$ and may therefore be used to measure, indicate, record, or control this height, regardless of the density or other variable property or attribute of the liquid.

Equation 7 is obviously analogous to Equation 3.

In Figure 4 a construction is shown whereby this ratio of parameters may be practically utilized.

In the vertical wall 39 of a housing 40 two discs 41 and 42 are mounted at a fixed vertical distance from each other. A post 43 is associated with the disc 41 and a post 44 is associated with the disc 42. These discs are the equivalents of diaphragms. Each is secured to the forward end of a liquid-tight substantially non-resilient bellows 45 mounted at its inner end in liquid-tight relation to the base of a protective recess in the wall 39. The posts 43 and 44 are articulated at their inner ends to the upper and lower ends, respectively, of a floating lever 46 whose intermediate portion bears against an arcuate surface 47. This surface is fixed in position and may be conveniently formed on the end of a suitable bracket 48 carried by the wall 39.

The lower articulation 49 may be an ordinary pivot; the upper one is preferably defined by a pin 50 on the post 43 and a slot 51 in the lever 46.

The post 43 continues rearwardly beyond the lever 46 and terminates in a magnetic core 52 of a solenoid coil 53. This coil has three taps, two of which (54, 55) are at its ends, the third one (56) being at its center. Wires 57, 58 and 59 are connected to these taps and may extend out of the housing 40 through a suitable conduit 60 to lead them to a remote point where the currents flowing through them may be utilized. Conduit 60 is preferably hollow so that variations in atmospheric pressure may be communicated to the interior of the mechanism.

The parts are so constructed and adjusted that the solenoid core 52 lies in a predetermined disposition when the height of the liquid is at a predetermined level, e. g., a selected level which is to be maintained, or from which deviations are to be indicated or regulated. Obviously, whenever the core 52 is exactly at the center of the coil 53, the inductances of the two halves of the coil are equal; but these inductances are thrown out of balance in proportion to the movements of the solenoid core 52 away from its central disposition. In the arrangement shown, the core moves further and further from the center as the level of the liquid rises.

The operation is as follows: The lever 46 always assumes a position in which it is in equilibrium, and it is enabled to do this by virtue of the fact that its fulcrum automatically shifts in the direction of the greater of the forces acting upon its ends. In any state of equilibrium, the opposing moments are of course equal, which means that the product of force $F_1$ and its lever arm is equal to the product of force $F_2$ and its lever arm. Thus, the ratio of the lever arms is directly proportional to the ratio of the forces $F_1$ and $F_2$. With any known curvature of the surface 47, the ratio of the lever arms is a function of the displacement of the fulcrum, hence of a known angular displacement of the lever 46. Therefore, the position assumed by the solenoid core 52 at any instant of time is a function of the ratio of forces $F_1$ and $F_2$, hence of the ratio $$\frac{F_1}{F_2 - F_1}$$

which is proportional to the height of the liquid, as shown by Equation 7.

In order that the bar 46 will engage the fulcrum 47 at the center of the bar 46 under balance conditions, the disc 41 is somewhat larger than disc 42 in the embodiment illustrated in Figure 4, so that at the desired balance condition the total pressure on the face of disc 41 will be equal to the total pressure on the face of disc 42.

In Figure 5 I have shown an illustrative electrical circuit responsive in the desired manner to the movements of the solenoid core 52. This core and the solenoid 53 are designated in Figure 5 by the same reference numerals as those employed in Figure 4. I have shown the solenoid connected in parallel with the secondary coil 61 of a transformer 62 whose primary 63 is connected at 64 to a suitable source of alternating current. The secondary coil 61 has three taps corresponding to those of the solenoid 53, the end taps being connected, respectively, to the end taps 54, 55 of the solenoid 53. This defines a bridge circuit. The center taps of the parallel coils lead to a suitable amplifier 65, the connection with the transformer coil being established by a wire 66 which is grounded.

When the solenoid core 52 is in its central position, no current flows into the amplifier. However, as the solenoid moves out of this position, a proportionate unbalance in the bridge circuit is brought about, and a corresponding current flows into the amplifier. After amplification, this current may be utilized for such indicating or other purpose as may be desired.

In Figure 6 I have shown an illustrative electric circuit by means of which the amplified current supplied by the amplifier may, if desired, be used to regulate inlet and outlet valves in such a way that the level of the liquid may be automatically regulated to maintain it at a selected height.

The wires 67 and 68 correspond to those bearing these same reference numerals in Figure 5. One of them is grounded and is also connected to the filaments of two triodes 69 and 70; while the other is connected to the grids of these tubes. In the plate circuit 71 of the tube 69 there is a relay 72 which makes and breaks a circuit controlling an inlet valve; and in the plate circuit 73 of the tube 70 there is a similar relay 74 which makes and breaks a circuit controlling an outlet or overflow valve. The inlet valve, when open, admits more liquid to the tank or chamber within which the present system is installed; the outlet valve, when open, allows liquid to flow out. In the control system illustrated, it is contemplated that the inlet valve will be open until the relay 72 operates (either by establishing or breaking a circuit) to close it; and that the outlet valve will be closed until such time as the relay 74 operates (again, either by establishing or breaking a circuit) to open it.

The achievement of the desired result is predicated upon the provision of a voltage source 75 which places a negative bias $V_1$ on the grid of the tube 69, and another voltage source 76 which places a predetermined greater negative bias $V_2$ on the grid of the tube 70. Assuming a rising level of liquid, the bias voltage $V_1$ is so chosen that no current will flow in the plate circuit 71 until the level of the liquid has reached the desired height, whereupon the relay 72 will be caused to function to close the inlet valve. The bias voltage $V_2$ is so chosen that no current will flow in the plate circuit 73 until a slightly greater liquid level has been reached, whereupon the relay 74 will function to open the outlet valve. Conversely, assuming that the level of the liquid is higher than that desired, the inlet valve will be closed and the outlet valve open. This will be due to currents flowing in both plate circuits. When the level of the liquid has dropped to the desired height, the current flow in the plate circuit 73 will be discontinued (due to the bias voltage $V_2$) and the relay 74 will operate to close the outlet valve. However, there will still be a current flow in the plate circuit 71, keeping the inlet valve closed as well. Should the level continue to drop, the current flow in the plate circuit 71 will be discontinued (due to the bias voltage $V_1$) and the relay 72 will operate to open the inlet valve. In this way, the desired liquid level may be maintained with considerable accuracy.

By adjusting the bias voltages $V_1$ and $V_2$, possibly by relatively simple rheostat adjustments or otherwise, the levels at which the inlet and outlet valves operate may be readily altered to suit varying requirements.

A mechanism such as that shown in Figure 4 may obviously be used in conjunction with an installation of the character shown in Figures 1 and 2, the two posts in each case being connected to a ratio-measuring device in the same way as the posts of Figure 4 are connected to the lever 46.

It will be understood that the mechanism shown in Figure 4, as well as the electric circuits of Figures 5 and 6, are purely illustrative, and that the principle of the invention may be embodied in various forms other than those depicted. For example, the desired ratio may be mechanically obtained with any of various structural arrangements well known in the art, or it can be obtained by electrical methods which measure and establish ratios between the variable quantities; such apparatus being well known to those familiar with the electrical art. In general, any mechanism capable of reacting to two parameters, one proportional to liquid pressure at the base level, the other to liquid density, and capable of translating this reaction into a usable force, mechanical, electrical, or otherwise, which is a function of the ratio between the parameters mentioned, can be employed to respond in selected fashion to height variations of the liquid.

The broad range of utility of the invention will be readily recognized. Merely by way of example, mention may be made of the storage tanks on ships, often used to transport liquids varying in density and in other characteristics; to the tanks used in the petroleum industry for storing liquids of various kinds during or after processes of refining or other treatment; and to the many instances in the chemical and allied industries where a single tank is used, from time to time, to store liquids of varying properties, or where the density of a liquid in a tank may be caused to undergo, or spontaneously undergoes, changes in density. In all cases of this general kind, an installation of the present character is of unique advantage because it responds to height variations alone and is not affected by other possible variations in the liquid.

Coupled with this basic advantge is the obvious abiilty to embody the present invention in compact units of standardized character, the installation of which, for any chosen purpose, is a matter of relatively low cost and of great simplicity, and whose continued functioning over long periods of time is both reliable and inexpensive. The ability to mount the apparatus in a completely enclosed housing, and the extremely low voltages involved, makes the use of the invention safe even with inflammable liquids notwithstanding the fact that elements of the apparatus may be electrical in character.

The materials of which the component parts of the apparatus may be composed are largely a matter of choice. The usual materials, such as brass or steel, have sufficiently low coefficients of thermal expansion to make the apparatus substantially free of temperature errors, but under certain circumstances it may be desirable to employ special alloys of unusually low coefficients of linear expansion for the movable posts and other elements of the mechanism.

As hereinbefore indicated, the curved surface 47 of Figure 4 may be of any selected curvature, and it may also be desirable to provide a curvature on the contacting surface of the floating lever 48.

In general, it will be understood that those skilled in the art may vary the details of construction and arrangement of parts in a variety of ways without necessarily departing from the spirit and scope of the invention as expressed in the appended claims. It is therefore intended that these details be considered as being purely illustrative.

Having thus described my invention and illustrated its use, what I claim as new and desire to secure by Letters Patent is:

1. A system responsive to varying heights of a liquid above a selected base level, comprising a movably mounted element communicating with said liquid at said base level and adapted to transmit a variable force proportional to the liquid pressure acting upon it, another similarly mounted element communicating with said liquid at a predetermined lower level and adapted to transmit a variable force proportional to the greater liquid pressure acting upon it, and a mechanism under the control of said elements and responsive to the ratio of said forces, said mechanism comprising a floating lever whose ends are subjected to said forces, respectively, and a curved surface against which the intermediate portion of said lever bears.

2. A system responsive to varying heights of a liquid above a selected base level, comprising a liquid-tight housing containing a compressible fluid at a substantially constant reference pressure, a diaphragm in a wall of said housing and communicating with said liquid at said base level, a post associated with said diaphragm and adapted to transmit a force proportional to the liquid pressure acting upon said diaphragm, another diaphragm in a wall of said housing and communicating with said liquid at a predetermined lower level, a post associated with said last-mentioned diaphragm and adapted to transmit a force proportional to the greater liquid pressure acting upon said diaphragm, and a mechanism within said housing and operatively connected to said posts and adapted to react to the ratio of the forces transmitted by said posts, said mechanism comprising a floating lever and a curved surface against which the intermediate portion of said lever bears.

3. Apparatus for measuring automatically the level of a liquid above a predetermined base level, comprising a first measuring element connected to said liquid at said base level and responsive to the pressure exerted by said liquid at that level, a second measuring element connected to said liquid and responsive to the density thereof, and ratio-taking means, said first element and second element being directly coupled to said ratio-taking means for combining said responses and indicating automatically the ratio of the values of said responses, said ratio-taking means including a floating lever having its ends coupled to said elements and having a fulcrum, said fulcrum being automatically shiftable toward one or the other end of said lever in a direction toward the element exerting the greatest force on said lever, whereby said indication is a function of the level of said liquid above the base level and independent of the density of said liquid.

4. Apparatus for measuring the height of a liquid above a predetermined base level and unaffected by changes in the density of said liquid, said apparatus comprising a first measuring element responsive to the pressure of said liquid at said base level to produce a first quantity which is a function thereof, a second measuring element responsive to the pressure of said liquid at a second level to produce a second quantity which is a function thereof, said second level being vertically displaced a predetermined distance from said base level, and a mechanism for measuring the ratio of said first and second quantities, said mechanism including a floating member arranged to bear against a surface in response to said two quantities, a first portion of said member connected to said first element and responsive to said first quantity, a second portion of said member connected to said second element and responsive to said second quantity, said surface being arcuate, whereby the position of said member is a measure of the ratio of said two quantities.

5. Apparatus for measuring the height of a liquid above a selected base level irrespective of the density of said liquid, said apparatus comprising a first movably mounted element communicating with said liquid at said base level, a first post directly coupled to said first element and adapted to transmit a first variable force which is a function of the liquid pressure acting upon said first element, a second movably mounted element communicating with said liquid at a second level, which is vertically displaced a predetermined distance from said base level, a second post directly coupled to said second element and adapted to transmit a second variable force which is a function of the pressure of said liquid at said second level, and a mechanism responsive to the ratio of said two forces, said mechanism comprising a rotatable mechanical member having a curved fulcrum surface against which it bears a first portion of said member being pivoted to said first post and a second portion of said member being slidingly pivoted to said second post, whereby the angular position of said member is a function of the height of the liquid above said base level.

CARL G. SONTHEIMER.

References Cited in the file of this patent

UNITED STATES PATENTS

| Number | Name | Date |
|---|---|---|
| 1,605,171 | Chance | Nov. 2, 1926 |
| 1,622,794 | Martin | Mar. 29, 1927 |
| 2,129,617 | Hill | Sept. 6, 1938 |
| 2,201,974 | Anderson | May 28, 1940 |
| 2,347,637 | Sprenkle | Apr. 25, 1944 |
| 2,354,847 | Woodbridge | Aug. 1, 1944 |
| 2,382,695 | De Giers | Aug. 14, 1945 |
| 2,434,098 | Bays | Jan. 6, 1948 |
| 2,459,542 | Rosenberger | Jan. 18, 1949 |